United States Patent [19]
Briggs, Jr.

[11] 3,899,237
[45] Aug. 12, 1975

[54] CONNECTING BLOCK STRUCTURES FOR MODULAR MAIN DISTRIBUTION FRAMES

[75] Inventor: Paul Raymond Briggs, Jr., Andover, N.J.

[73] Assignee: Bell Telephone Laboratories, Incorporated, Murray Hill, N.J.

[22] Filed: Sept. 10, 1973

[21] Appl. No.: 395,632

[52] U.S. Cl. .................. 339/99; 339/198 R
[51] Int. Cl.[2] .................. H01R 9/06
[58] Field of Search .................. 339/99, 198, 91 R; 174/72 A

[56] References Cited

UNITED STATES PATENTS

| | | | |
|---|---|---|---|
| 3,024,301 | 3/1962 | Walch | 174/72 A |
| 3,112,147 | 11/1963 | Pferd et al. | 339/198 R |
| 3,260,793 | 7/1966 | Edelman | 174/72 A |
| 3,485,937 | 12/1969 | Caveney | 174/72 A |
| 3,569,909 | 3/1971 | Garver | 339/91 R |
| 3,636,500 | 1/1972 | Sedlacek | 339/97 R |
| 3,777,223 | 12/1973 | Chandler et al. | 339/198 R |

*Primary Examiner*—Roy D. Frazier
*Assistant Examiner*—Robert A. Hafer
*Attorney, Agent, or Firm*—C. S. Phelan

[57] ABSTRACT

In a modular main distribution frame on which thousands of wire terminations and cross connections are made, it is essential that the terminations and cross connections be made reliably. By configuring a snap-in connector block for such a main frame, reliable terminations of outside plant cable pairs and switching equipment cable pairs are readily effected. The utilization on the connector block of wire fanning strips having a one-way gate action virtually eliminates torsional fatigue induced in cross connection jumper wires by inherent rotational forces in the jumper wires themselves. The virtual elimination of the torsional fatigue significantly improves the reliability of jumper wire cross connections.

9 Claims, 7 Drawing Figures

PATENTED AUG 12 1975

3,899,237

SHEET 1

CONNECTING BLOCK STRUCTURES FOR MODULAR MAIN DISTRIBUTION FRAMES

BACKGROUND OF THE INVENTION

1. Field of the Invention

This invention relates to electrical connectors and, in particular, to connecting blocks for use on a telephone central office modular main distribution frame.

2. Description of the Prior Art

A modular main distribution frame within a telephone central office serves as the termination point for outside cable pairs from each of the individual subscribers as well as the termination point for various central office equipments, particularly, the multiple switch terminals of the switching equipment. Interconnection of a subscriber line terminal pair to a switching equipment terminal pair is effected on the main frame by means of cross connection jumper wires.

Existing modular main distribution frames have fixedly mounted connectors for terminating the subscribers line cable pairs and the switching equipment cable pairs. Typically, to effect one of these terminations requires a craftsman to work at the end of a relatively narrow (on the order of 6 inches) and long (on the order of 8 inches) cable distribution trough. Because of this limited space, the inherent limited visibility, and the density of terminal pairs to which connection is to be made, the wiring of such a modular main distribution frame is costly in time and subject to a multiplicity of wiring errors.

Accordingly, it is one object of the present invention to improve the reliability in the termination of subscriber line cable pairs and switching equipment cable pairs on a modular main distribution frame.

It is a further object to configure a connecting block structure wherein the electrical terminal pairs are in plain view and readily accessible to a craftsman terminating subscriber line cable pairs and switching equipment cable pairs.

Still another object of the present invention is to reduce the amount of time required to effect a reliable termination and thereby to lower the overall operating cost for maintaining a modular main distribution frame.

Not only do existing modular main distribution frames present problems for effecting reliable subscriber line terminations and switching equipment terminations, the cross connection of these two types of terminations by jumper wires results in a further problem. This problem arises through the torsional fatigue imparted to a jumper wire after it has been installed. The primary cause of this fatigue is that the comb-like detail of the connector block wire fanning strips permits dressed wires to rotate up and out of the fanning strip about the point of contact of the jumper wire with the electrical terminals. This rotational force is due to the jumper wires having a tendency to remain in a straight line connection between the two termination points, as compared to a generally U-shaped orientation when wire fanning strips are used to route the jumper wires. In addition, craftsmen tracing out wiring tend to further aggravate this problem.

In view of the foregoing it is a further object of the present invention to improve the reliability of jumper wire cross connections.

Still another object is to minimize the rotational forces in jumper wires.

An additional object of the present invention is to virtually eliminate jumper wire conductor failure caused by torsional fatigue.

SUMMARY OF THE INVENTION

The foregoing and other objects of the invention are realized in an illustrative embodiment wherein an insulating block body is molded from a thermoplastic resin in such a way that a plurality of apertures are produced uniformly over the surface of the block body. These apertures extend entirely through the smaller thickness dimension of the block body. Welded twin-clip terminal assemblies are inserted into each of these apertures. First and second wire fanning strips are attached to the block body by self-tapping screws.

Both wire fanning strips have shallow grooves which extend along their entire length. These shallow grooves mate with a tongue on the side profile of the block body thereby adding to the overall strength of the connector block assembly. Also, both fanning strips have a one-way gate action wire retaining structure. This one-way gate action results from a progressive tapering of a wire insertion slot which extends from an outside edge of the fanning strip to a wire retaining aperture. This tapered slot narrows to a width slightly less than the diameter of a jumper wire at the wire retaining aperture. A pair of wire deflection lips, one on either side of the tapered slot, extend the tapered slot into the wire retaining aperture. The combination of the tapered slot and the pair of wire deflection lips inhibits a jumper wire, once inserted into the retaining aperture, from slipping back out under its own rotational force. This minimization of the rotational forces in the jumper wires virtually eliminates any resulting torsional fatigue and thereby significantly improves the reliability of jumper wire cross connections.

Another aspect of the connector block assembly which has a pronounced effect on the improvement in the reliability of subscriber line cable pair terminations and switching equipment cable pair terminations is that the connector block is configured for snap-in installation. The snap-in aspect permits the craftsman to permanently terminate the subscriber line cable pairs and the switching equipment cable pairs on solderless wirewrap terminals, which are part of the welded twin-clip terminal assembly, while the connector blocks are in a snapped-out position. The improvement in the reliability of these terminations results from the wirewrap terminals being more clearly in view and significantly more accessible to the craftsman. In addition, the number of reliable connections that can be made in any given time interval is markedly increased, and this in turn results in a reduction of the operating costs for maintaining a modular main distribution frame. After the subscriber line cable pair terminations and the switching equipment cable pair terminations are made, the connector blocks are snapped into the modular main distribution frame whereupon the two types of cable pair terminations are interconnected via the cross connection jumper wires.

BRIEF DESCRIPTION OF THE DRAWINGS

The aforementioned aspects, features and objects of the invention as well as other aspects, features and objects will be better understood upon a consideration of the following detailed description and the appended claims in connection with the attached drawings of an illustrative embodiment in which

DETAILED DESCRIPTION

Any large scale modular main distribution frame includes tremendous numbers of wire termination points. In synthesizing such a large scale modular main distribution frame, it is desirable to incorporate a quantity of termination points into a single structure which is considerably smaller than the modular main distribution frame itself, but large enough to accommodate a substantial number of individual termination points. Such as intermediate structure is a connector block assembly having capacity for the termination of anywhere from about fifty to a few hundred individual cable pairs. In view of the numbers of connector blocks used to synthesize a modular main distribution frame, the construction of such a connector block should be simple, reliable, durable and inexpensive.

Figure 1:
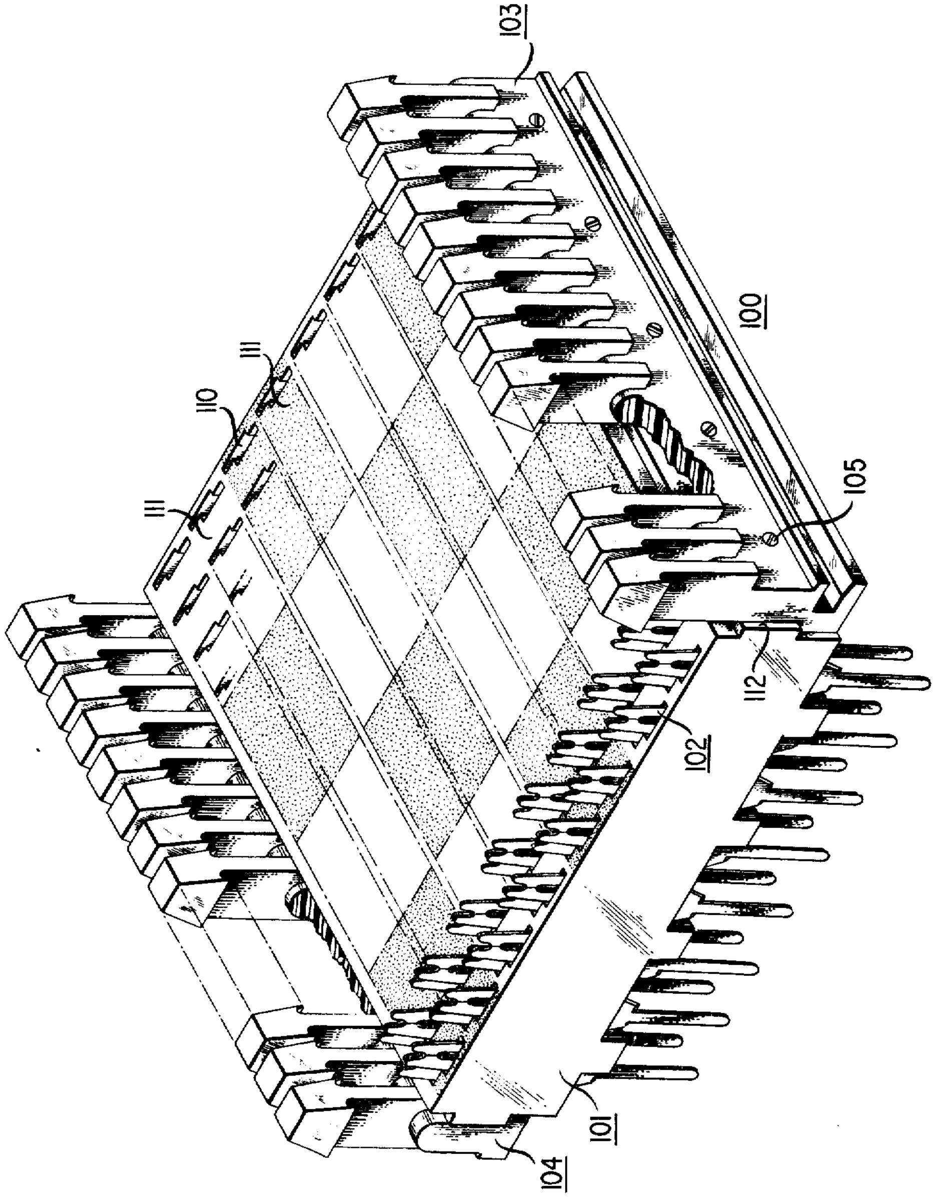
FIG. 1 is a perspective view of a connector block assembly.
Figure 3:
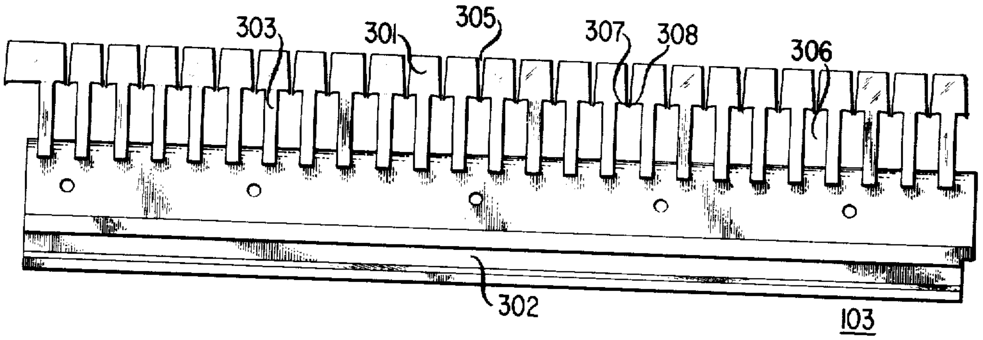
FIG. 3 is a top view of a first wire fanning strip.

The connector block assembly 100 illustrated in FIG. 1 includes an insulating block body 101, clip-type electrical terminal assemblies 102, and first and second wire fanning strips 103 and 104. First and second wire fanning strips 103 and 104 are attached to the block body 101 by self-tapping screws 105.

Insulating block body 101 is injection-molded of a high inpact, fire retardant, polycarbonate, thermoplastic resin. Use of this material for the block body 101 ensures that the connector block assembly 100 is capable of withstanding the shear and flexible forces placed upon it in a telephone central office modular main distribution frame. These forces arise from the quantity of terminal assemblies 102 which are carried on any given connector block assembly 100, from the bulk of cross connection jumper wire (not shown) terminated thereon, and from the vertical mounting of the connector block assembly 100 on the modular main distribution frame.

In the molding of the block body 101 generally Z-shaped apertures 110, extending entirely through the smaller thickness dimension of the block body 101, are uniformly distributed over the surface area defined by the two larger dimensions. In the preferred embodiment, all block bodies 101 are molded of an opaque white resin. Subsequently, certain adjacent terminal groups 111 on the block body 101 are associated with each other because of switching equipment or cabling increments. In order to easily indentify these terminal groups 111, a brightly colored checkboard pattern is hot stamped on the surface of the block body 101. In addition, a black grid pattern (not shown) is stamped on the opposite side of the block body 101. This grid pattern outlines the terminal groups 111 that appear on the front face. The black grid pattern aids in cable installation and service observation.

Figure 2:
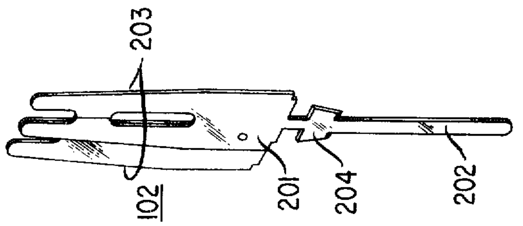
FIG. 2 illustrates a single welded twin-clip terminal assembly.

In view of the large number of terminations made on a modular distribution frame, it is essential that the terminations be effected rapidly, reliably and inexpensively. Terminal assemblies 102, shown more clearly in FIG. 2, meet all of these requirements. One of these terminal assemblies 102 is inserted into each of the apertures 110. Because of the nature of the terminations and the interconnections that are typically made on a modular main distribution frame, terminal assemblies 102 utilize a double-ended structure 201 with solderless wirewrap cable terminals 202 at one end and a pair of bifurcated insulation penetrating quick-connect jumper terminals 203 at the opposite end. The solderless wirewrap cable terminals 202 are used for terminating subscriber line cable pairs (not shown) or switching equipment cable pairs (not shown), whereas the bifurcated insulation penetrating quick-connect jumper terminals 203 are used in completing on a make-before-break basis the interconnection between specified subscriber line cable pairs and specified switching equipment cable pairs with jumper wires. Utilization of the double-ended structure 201 for the terminal assemblies 102 allows the clip 204 to be snapped into the Z-shaped apertures 110 in the block body 101 during assembly and replaced on an individual basis for field maintenance.

One method of making the terminal assemblies 102 is to stamp out a pair of the double-ended structures 201 which include the solderless wirewrap cable terminals 202 and one-half of the bifurcated insulation penetrating quick-connect jumper terminals 203. These stampings are made from a phosphor bronze strip having a spring temper. The solderless wirewrap cable terminal 202 is removed from a first one 203A of these stampings and the remaining one-half of the bifurcated insulation penetrating quick-connect jumper terminal 203 is spot welded at a laterally displaced point to the second one 203B of the stampings. The spot welding completes the assembly of the welded twin-clip terminals 102. This construction permits terminals 203A and 203B to be separately accessible.

Because of the number of jumper wire terminations that are made and because of the number of cross connection jumper wires that are carried on any individual connector block assembly 100, the number being on the order of one hundred, it is desirable that the individual dressed jumper wires be routed to their appropriate destination at the opposite termination point in an orderly fashion. This orderly routing of jumper wires decreases the incidence of jumper wire entanglement which can lead to wiring congestion and possibly to failure of the modular main distribution frame itself. To circumvent these potential problems, the connector block assembly 100 utilizes first and second wire fanning strips 103 and 104 for jumper wire routing.

The first and second wire fanning strips 103 and 104, shown in FIGS. 3 through 6, are injection-molded from the same high impact, fire retardant, polycarbonate, thermoplastic resin used to mold the block body 101. Both the first and second wire fanning strips 103 and 104 have a plurality of truncated tetrahedron-shaped members 301 connected to strip body 302 by beams 303. The truncated tetrahedron-shaped members 301 and beams 303 extend along the entire length of the first and second wire fanning strips 103 and 104 in a comb-like arrangement. The uniformity of the spacing of the tetrahedron-shaped members 301 from strip body 302 allows for the hot stamping of appropriate terminal column or cable pair designations on the members 301. These designations facilitate the location of specific terminal pairs on the connector block assembly 100. In addition, adjacent pairs of truncated tetrahedron-shaped members 301 define a progressively tapered wire insertion slot 305. Wire insertion slot 305 has a width which continuously narrows until it becomes slightly less than the diameter of a jumper wire at a wire retaining aperture 306 defined by adjacent pairs of beams 303, strip body 302 and first and second wire deflection lips 307 and 308. The first and second wire deflection lips 307 and 308 are disposed on opposite sides of the wire insertion slot 305, and extend the wire insertion slot 305 a short distance into the wire retaining aperture 306. Each of the wire deflection lips 307 and 308 is wedge-shaped with the point of the wedge directed away from the wire insertion slot 305.

The tapered wire insertion slot 305 along with the first and second deflection lips 307 and 308 interact to produce a one-way gate action. This one-way gate action causes a jumper wire, once inserted into the wire retaining aperture 306, to become entrapped. The interaction among the wire insertion slot 305 and the first and second wire deflection lips 307 and 308 in order to entrap a jumper wire arises from the wire insertion slot 305 narrowing in width to slightly less than the diameter of a jumper wire at the first and second wire deflection lips 307 and 308. Therefore, to insert a jumper wire into the wire retaining aperture 306, the wire insertion slot 305 must be enlarged slightly during insertion to permit the jumper wire to gain entry. This enlargement is temporary and results from flexure of adjacent beams 303. Once the jumper wire is inserted into the wire retaining aperture 306, the wedge shape of the first and second wire deflection lips 307 and 308, wherein the point of the wedge is farthest from the wire insertion slot 305, causes the jumper wire to be directed away from the wire insertion slot 305 should any rotational forces induced in the jumper wire tend to rotate the jumper wire up and out of the first and second wire fanning strips 103 and 104. These rotational forces are imparted to a jumper wire through its tendency to remain in a straight line path between the two termination points. Entrapment of the jumper wire minimizes these rotational forces with the minimization further resulting in a virtual elimination of jumper wire conductor failure caused by torsional fatigue. This, in turn, significantly improves the reliability of cross connection jumper wire terminations.

Both the first and second wire fanning strips 103 and 104 have mounting grooves 401 extending along their entire length. These mounting grooves 401 mate with tongues 112 on the side profiles of block body 101 with the resultant effect that the overall strength of the connector block assembly 100 is improved when the first and second wire fanning strips 103 and 104 are affixed to block body 101.

Figure 7:
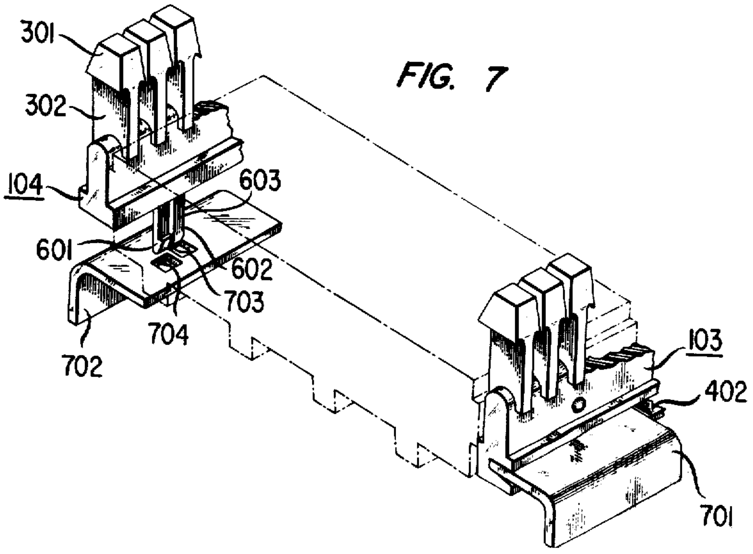
FIG. 7 illustrates the snap-in mounting of a connector block assembly on a modular main distribution frame using bidirectional latching spring members.

To effect the snap-in mounting of the connector block assembly 100 on the modular main distribution frame, such a mounting arrangement facilitating the termination of subscriber line cable pairs and switching equipment cable pairs, the first wire fanning strip 103 is configured to include an indexing groove 402. Indexing groove 402 is generally U-shaped and extends along the entire length of the first wire fanning strip 103. The indexing groove 402 fits over a top mounting flange 701, as shown in FIG. 7, providing vertical alignment of the connector block assembly 100 on the modular main distribution frame and compensating for any dimensional variations of less than the depth of the groove between the top mounting flange 701 and a bottom mounting flange 702. Indexing groove 402 further acts in conjunction with mounting elements on the second wire fanning strip 104 to complete the snap-in mounting of the connector block assembly 100 on the modular main distribution frame.

Figures 4, 5, 6:
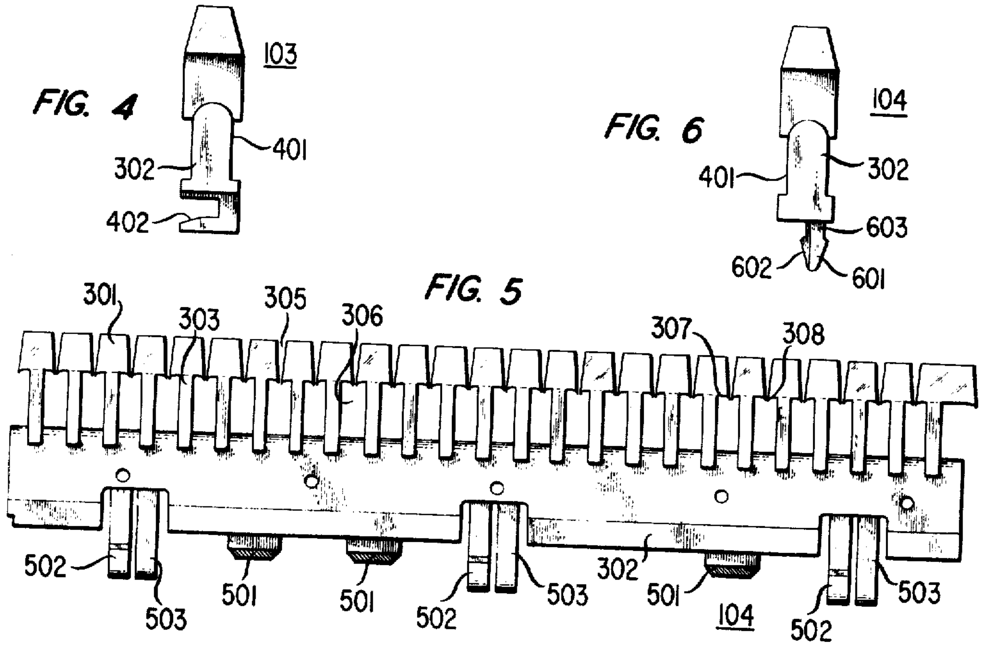
FIG. 4 is an end view of the first wire fanning strip illustrating an indexing groove used in the snap-in mounting arrangement.
FIG. 5 is a top view of a second wire fanning strip.
FIG. 6 is an end view of the second wire fanning strip.

The mounting elements on the second wire fanning strip 104, shown in FIGS. 5 and 6, include a strip body 302 to which are affixed a plurality of locating pins 501 and pairs of bidirectional latching spring members 502 and 503. Locating pins 501 are interposed between the pairs of bidirectional latching spring members 502 and 503 and, when indexed into rectangular apertures on the bottom mounting flange 702 shown in FIG. 7, provide horizontal alignment of the connector block assembly 100 on the modular main distribution frame. The locating pins 501 also provide protection from shear and flexive forces which would be exerted on the bidirectional latching spring members 502 and 503 if locating pins 501 were absent.

Each pair of bidirectional latching spring members 502 and 503 has a half arrowhead-shaped top 601 and 602, respectively, at the end of a spring beam 603. Spring beams 603 are affixed to the strip body 302. The half arrowhead-shaped tips 601 and 602 are oppositely directed with respect to one another in the vertical mounting plane. During installation of the connector block assembly 100, the tips 601 and 602 are inserted through additional apertures in the bottom mounting flange 702. Passage through these apertures causes tips 601 and 602 to be brought into a parallel axial alignment by the flexure of spring beams 603. After the tips 601 and 602 have cleared the front edge of the aperture, spring beams 603 return to their normal position causing tips 601 and 602 to engage the rear top and bottom edges 703 and 704, respectively, of the apertures. A typical installation profile is shown in FIG. 7.

Utilization of a snap-in mounting arrangement for the connector block assembly 100 allows for the termination of the subscriber line cable pairs and switching equipment cable pairs on the solderless wirewrap terminals 202 while these terminals are in the plain view of the craftsman. This results in more reliable terminations being effected by the craftsman in any given period of time when compared with the number of such terminations made on main distribution frames not having snap-in mounting of the connector block assemblies 100.

In all cases it is understood that the above described embodiment is illustrative of but a small number of the many possible specific embodiments which can represent applications of the principles of the invention. Thus, numerous and varied other arrangements can readily be devised in accordance with these principles by those skilled in the art without departing from the spirit and scope of the invention.

What is claimed is:

1. A connector block for modular main distribution frames comprised of an insulating block body having a plurality of apertures therein, a plurality of clip-type electrical terminals inserted in said apertures, a wire fanning strip having at least one one-way gate wire retaining aperture comprising a strip body, first and second beam members affixed to said strip body, first and second head members affixed to said first and second beam members, respectively, each of said head members having a generally truncated tetrahedron shape, a progressively tapered wire insertion slot, said slot narrowing in width to slightly less than the diameter of a jumper wire at said retaining aperture, said slot being formed by said first and second head members, and first and second wire deflection lips on either side of said insertion slot, said lips being affixed to said first and second head members, for extending said slot into said retaining aperture, and means for attaching said fanning strip to said insulating block body.

2. The connector block in accordance with claim 1 wherein each of the clip-type electrical terminals includes a pair of bifurcated insulation penetrating quick-connect terminals at one end, said terminals affixed to one another at a laterally displaced point so that each terminal of said pair is separately accessible, and a solderless wirewrap terminal at the opposite end.

3. A connector block for modular main distribution frames comprised of a plurality of clip-type electrical terminals each of said terminals including a pair of bifurcated insulation penetrating quick-connect terminals at one end, said terminals affixed to one another at a laterally displaced point so that each terminal of said pair is separately accessible, and a solderless wirewrap terminal at the opposite end, an insulating block body having a plurality of apertures therein for accepting said clip-type terminals, each of said apertures comprised of a pair of juxtaposed rectangular apertures laterally displaced from one another, first and second wire fanning strips having one-way gate wire retaining apertures, and means for attaching said fanning strips to said insulating block body.

4. The connector block in accordance with claim 3 wherein the one-way gate wire retaining apertures of the first and second wire fanning strips include a progressively tapered wire insertion slot, said slot narrowing in width to slightly less than the diameter of a jumper wire at said wire retaining aperture, and first and second wire deflection lips on either side of said insertion slot for extending said slot into said wire retaining aperture, said wire deflection lips having a slot side cooperating with the rest of said slot for guiding wires into said retaining aperture and an aperture side for deflecting wires in said retaining aperture away from said wire insertion slot.

5. The connector block in accordance with claim 3 wherein the first wire fanning strip includes a generally U-shaped groove extending along the entire length of said first fanning strip, said groove being used to vertically index said connector block on a mounting flange on said modular main distribution frame.

6. The connector block in accordance with claim 3 wherein the second wire fanning strip includes a plurality of locating pins for horizontally aligning said connector block during the mounting of said connector block on said modular main distribution frame, said locating pins also providing protection against shear and flexive forces, and a plurality of bidirectional latching spring members for securing said connector block to said modular main distribution frame.

7. The connector block in accordance with claim 6 wherein the first wire fanning strip includes a generally U-shaped groove extending along the entire length of said first fanning strip, said groove in conjunction with said locating pins and said bidirectional latching spring members of said second fanning strip providing an adjustable mounting arrangement wherein dimensional variations on the order of the depth of said groove between first and second mounting flanges on said modular main distribution frame are negated.

8. A connector block comprising means for separately terminating a plurality of electrical conductors, each of said plurality of separate terminating means including a pair of bifurcated insulation slicing quick-connect terminals at one end, and a solderless wirewrap terminal at the opposite end, means for mounting said termination means in a grid-like array, said termination mounting means including an insulating block body having a plurality of apertures therein for accepting said bifurcated insulation slicing terminals, each of said apertures comprised of a pair of juxtaposed rectangular apertures laterally displaced from one another, and means for reducing torsional fatigue in said conductors said fatigue induced by inherent rotational forces in said conductors, said fatigue reducing means comprising a wire fanning strip having one-way gate wire retaining apertures configured to make removal of said conductors through said gate more difficult than insertion through said gate.

9. A wire fanning strip having at least one one-way gate wire retaining aperture comprising a strip body, first and second beam members affixed to said strip body, first and second head members affixed to said first and second beam members, respectively, each of said head members having a generally truncated tetrahedron shape, a progressively tapered wire insertion slot said slot narrowing in width to slightly less than a nominal wire diameter, said slot being formed by said first and second head members, and first and second wire deflection lips on either side of said slot, said lips being affixed to said first and second head members, and extending said slot into said retaining aperture.

* * * * *